(12) United States Patent
Jacquet et al.

(10) Patent No.: US 6,590,891 B1
(45) Date of Patent: Jul. 8, 2003

(54) SYSTEM FOR THE TRANSMISSION OF DATA TO SYNCHRONISED RELAY STATIONS AND CORRESPONDING PROCESS

(75) Inventors: Philippe Jacquet, Buc (FR); Paul Muhlethaler, Maisons-Laffitte (FR)

(73) Assignee: Inria Institut National de Recherche en Informatique et en Automatique, Le Chesnay Cedex (FR)

( * ) Notice: Subject to any disclaimer, the term of this patent is extended or adjusted under 35 U.S.C. 154(b) by 0 days.

(21) Appl. No.: 09/307,815

(22) Filed: May 10, 1999

(30) Foreign Application Priority Data

May 11, 1998 (FR) .............................................. 98 05893

(51) Int. Cl.$^7$ ................................................ H04J 3/06
(52) U.S. Cl. ...................................... 370/350; 370/509
(58) Field of Search ................................ 370/350, 503, 370/509, 512, 514, 516, 515, 517, 338; 455/502, 501; 375/354, 356, 358, 371, 363

(56) References Cited

U.S. PATENT DOCUMENTS

| | | | |
|---|---|---|---|
| 5,206,881 A | | 4/1993 | Messenger et al. |
| 5,365,516 A | | 11/1994 | Jandrell |
| 5,388,102 A | * | 2/1995 | Griffith et al. .............. 370/503 |
| 5,446,769 A | | 8/1995 | Shaver et al. |
| 5,448,570 A | | 9/1995 | Toda et al. |
| 5,519,759 A | | 5/1996 | Heineck et al. |
| 5,787,078 A | * | 7/1998 | Geywitz et al. ............. 370/331 |
| 6,272,118 B1 | * | 8/2001 | Wewers et al. .............. 370/330 |

FOREIGN PATENT DOCUMENTS

| | | |
|---|---|---|
| EP | 2 293 526 A | 9/1995 |
| EP | 0 709 983 A1 | 5/1996 |
| EP | 0 804 006 A2 | 10/1997 |
| WO | 96/03823 | 2/1996 |
| WO | 97/47096 | 12/1997 |

\* cited by examiner

*Primary Examiner*—Ajit Patel
(74) *Attorney, Agent, or Firm*—Rabin & Berdo, P.C.

(57) ABSTRACT

Connected relay stations of a network each include a network number, a clock (4) defining a local reference time, a module (3) for transmitting/receiving messages on a frequency varying according to a selected time-division scheme defined relative to the local reference time, and a control module (5) for the messages. The control module of a synchronising relay station (SH) forms synchronisation messages including its network number, a common frequency, its time-division evolution scheme and a common reference time, for the transmission thereof. In addition, each relay station (SH) includes a synchronisation module (7) capable of extracting the information contained in a synchronisation message received bearing a common network number, in order, on the one hand, to readjust the local reference time defined by the clock (4) to the common reference time and, on the other hand, to provide the transmitting/receiving module (3) with the common frequency extracted and its time-division scheme, such that the relay station is frequency-synchronised with the synchronising station and in turn becomes a synchronising station.

31 Claims, 5 Drawing Sheets

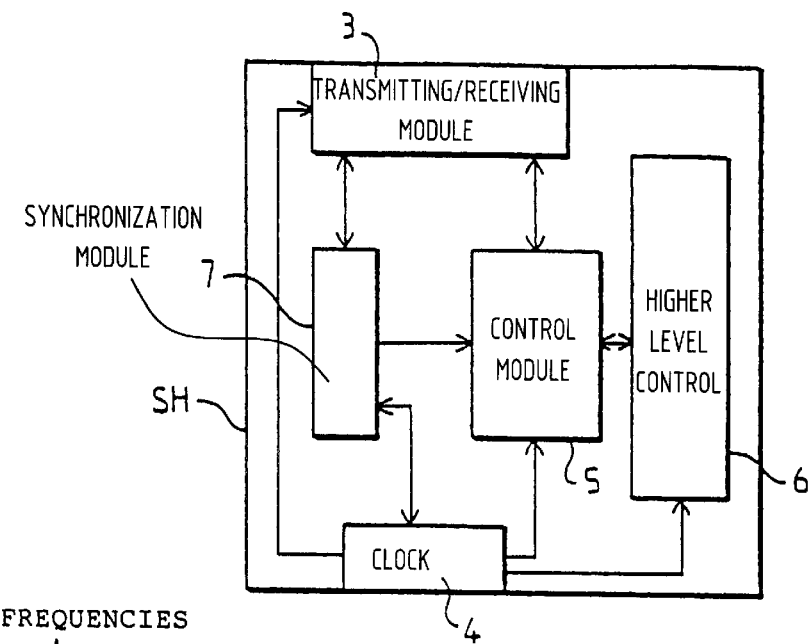
FIG. 2
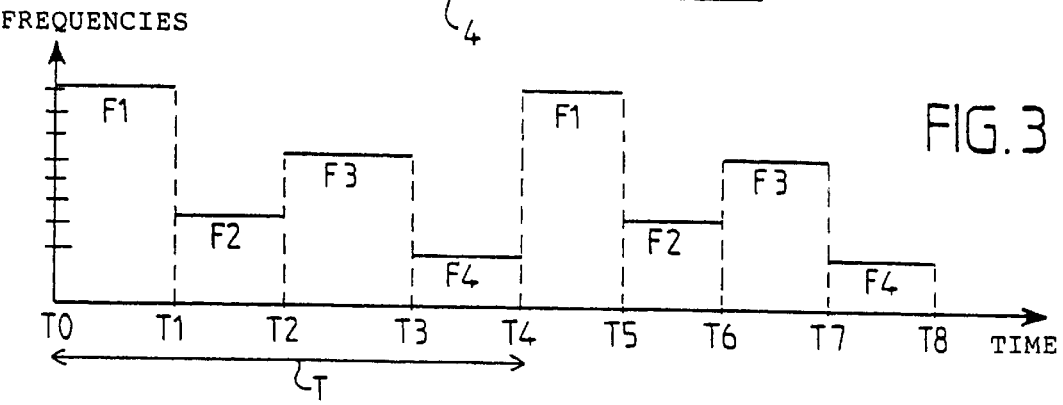
FIG. 3
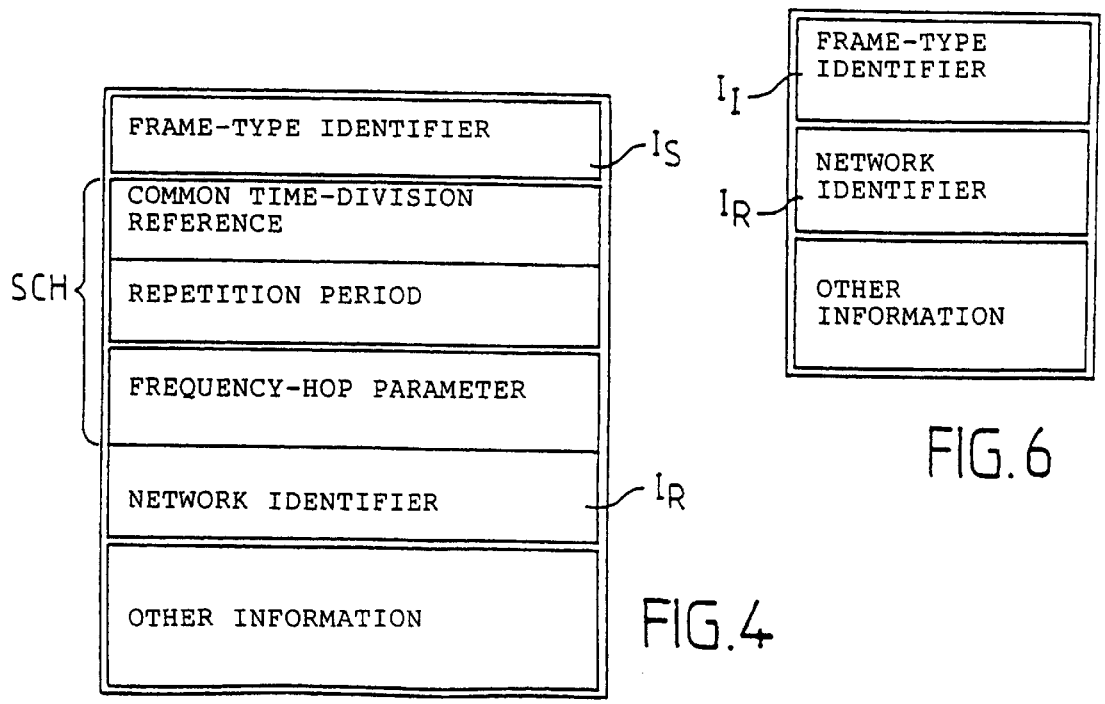
FIG. 4
FIG. 6

SYSTEM FOR THE TRANSMISSION OF DATA TO SYNCHRONISED RELAY STATIONS AND CORRESPONDING PROCESS

The invention relates to the field of data processing systems for the exchange of data or messages between extensions or stations of one or more networks.

These systems are sometimes provided with relay stations provided with a network number and comprising, inter alia, a clock which defines a local reference time, a module intended to transmit/receive messages on a frequency which varies according to a selected time-division scheme (the schemes may vary from one station to the next) defined relative to the local reference time, and a control module which forms the messages to be transmitted and processes the messages received in order, e.g. to relay them towards other stations.

Some systems include relay stations of this type referred to as "variable frequency" relay stations, intended, inter alia, to relay messages towards other stations which may or may not be relay stations. Relay stations of this kind may be, e.g. access points (or bridges) of a wire network for the exchange of messages between stations of the wire network and mobile stations of a radio network. In this example, each relay station can communicate with several "non-relay" stations with which it forms a cell. A network can therefore be broken down into several cells which communicate by means of their respective relay stations.

As a result of the fact that the relay stations have personal non-synchronised clocks, they have the disadvantage that they are independent of one another, as, whether their respective time-division evolution schemes are identical or not, some of them may lag behind, with the result that the frequency on which one of the relay stations is transmitting at a given moment is not the frequency on which another relay station is receiving at this same moment.

This means that transmission between different cells is impossible as there has been no frequency tuning between these cells. This impossibility will last, on average, all the longer the greater the number of relays required for transmission, given that there must be frequency tuning at each relay.

The aim of the invention is therefore to provide a data transmission system and a corresponding process which do not have the aforementioned disadvantage.

To this end, it proposes a system of the type described in the introduction, in which:

on the one hand, the control module of each relay station brought into a selected state is adapted to form synchronisation messages including its network number and information relating to this selected state and intended at least for certain other relay stations, at least one of the relay stations, referred to hereinafter as the "master station", having a control module permanently verifying this selected criterion, and, on the other hand, each relay station (both the master station and the other stations referred to hereinafter as "slave stations") includes a synchronisation module capable, upon receiving a synchronisation message containing the same network number as its own, of extracting the status information therefrom in order to bring its relay station into the selected state.

According to another feature of the invention, the information relating to the said selected state contained in the synchronisation messages includes at least information relating to a common reference time and to a common frequency and, inter alia, representative of the time-division scheme of this common frequency.

In this case, each synchronisation module is adapted to extract the information relating to the common frequency and to the common reference time from a synchronisation message received by the transmitting/receiving module associated therewith in the relay station, then, on the one hand, to adjust the local reference time defined by the local clock to the common reference time and, on the other hand, to provide the transmitting/receiving module with the information relating to the common frequency. The relay station is then considered to be in the selected state, on the one hand, when its local reference time is the common reference time and, on the other hand, when its transmitting/receiving module is ready to transmit/receive messages on the common frequency varying according to the time-division scheme of the latter.

By definition, the term synchronised station shall refer to a station brought into the selected state, i.e. a station which has been synchronised with the common reference time received from a synchronising station which may be a master station or a slave station which has just been synchronised and which relays (or broadcasts) the initial synchronisation message. In other words, a master station is necessarily a synchronising station, while a slave station can only be considered to be a synchronising station once it has been synchronised.

In this manner, by virtue of a synchronising station according to the invention, several cells independent of one another can be converted into one super cell forming a global network in which the messages can pass through from one cell to the next (or possibly from a segment of a first network to a segment of a second network).

These can be radio network segments (or cells) or radio and wire network segments, the formats of which are preferably selected, in the case of radio networks, from at least the formats of the "HIPERLAN" standard and IEEE standard 802.11 and, in the case of wire networks, from at least the ISO standards for the IEEE standards 802.3, 802.5 and 802.14.

The HIPERLAN format is described, inter alia, in the publications of the European Telecommunications Standards Institute (ETSI) and, more particularly, in "Technical Standard ETS-300-652".

In the case of IEEE standard 802.11, the invention allows for the synchronisation of the access points ("Access Point AP"), such that they can use the radio interface as a distribution system ("Distribution System DS") in order to communicate with one another. Extended radio networks ("Extended Service Set ESS") using solely radio interfaces can therefore be obtained by virtue of the invention.

The system is moreover particularly suitable for networks referred to as "frequency-hop" networks or "direct-sequence spectrum spreading" networks, well known to the person skilled in the art.

According to yet another feature of the invention, the master (or synchronising) and slave relay stations are preferably connected together, i.e. there is a path between two arbitrary stations formed by stations within radio range.

The common frequency, its time-division evolution scheme and the common reference time are preferably the local parameters of the synchronising (or master) station. However, these could of course be partially or completely different parameters.

The information contained in the synchronisation message and relating to the common frequency advantageously comprises the list of frequencies and the respective durations of these frequencies or an identifier for the list of frequencies in its evolution scheme and the respective durations of these frequencies.

According to yet another feature of the invention, each synchronising station can place in the synchronisation message an identifier intended to signal to the slave relay stations and possibly to other recipient synchronising stations the type of message it is transmitting thereto, i.e. the fact that it is a synchronisation message. In order to make use of this information, each transmitting/receiving module is capable of detecting the presence of the identifier, such that only the synchronisation messages containing it are transmitted directly to the synchronisation module for the extraction of the information they contain.

In one particularly advantageous embodiment, the transmitting/receiving modules of at least the slave relay stations are adapted to be adjusted successively to the different frequencies provided by their respective time-division evolution schemes for predetermined periods so as to be able to pick up any synchronisation message from the synchronising station (master or synchronised slave station).

These operations for successive adjustment to different frequencies (or scanning) are preferably effected when the station in question is put into operation or after each modification carried out at a station, relating, e.g. to its time-division evolution scheme or to its network number if it has one.

According to yet another feature of the invention, when the aim of the system is to connect different networks together, even only momentarily, it can advantageously assign network numbers to its different master and slave relay stations, e.g. when they are put into operation.

In this case, each transmitting/receiving module is advantageously adapted to detect the network number contained in a synchronisation message, such that only the synchronisation messages containing a network number identical to the one detected are transmitted directly to the synchronisation module for the extraction of the information contained therein. All of the other synchronisation message can thus be rejected without further processing, as a result of which the relay station can be freed for other tasks.

The synchronisation messages are preferably transmitted spontaneously, and more preferably periodically, as once the time-division evolution scheme of the common frequency is known, either the relay station in question remains synchronous with the other synchronised stations, and consequently there is no longer a problem, or the clocks of the synchronised station drift relative to one another. Spontaneous and periodic transmission of synchronisation frames is consequently particularly advantageous as a result of the fact that synchronisation between the synchronised stations can be maintained, thereby also optimising the synchronisation period for a new station.

In the case described hereinabove, the synchronisation module of each synchronised relay station (both master and slave relay station) is capable, when a synchronisation message is received from a relay station, on the one hand, of comparing its local reference time with the common reference time contained in this message and, on the other hand, of automatically readjusting its local reference time to the common reference time if the former lags behind the latter.

According to yet another feature of the invention, the control modules of the slave relay stations are adapted to form polling messages including at least their network number and requesting the transmission of a synchronisation message by the synchronising station (master or synchronised slave station). It will be clear that the control module of the master station and the slave stations must to this end be adapted to process polling messages of this kind and in return to form a synchronisation message comprising the network number of the transmitting slave relay station for the transmission thereof towards the latter. A message of this kind can also be accompanied by the identifier for the requesting station.

Other options can also be envisaged, separately or in combination:

the (master) synchronising station may be adapted to place in the synchronisation message information specifying that it is in fact the synchronising station permanently in the selected state;

the system may comprise designating means capable of defining the status of the different relay stations, namely master (or initially synchronising) station or slave relay station. In this case, the designating means may be capable of designating a slave relay station as an auxiliary synchronising station brought into the selected state, such that it can replace the synchronising (or master) station in the event of a breakdown.

This designation is preferably effected when the relay station in question is put into operation.

The replacement may be automatic if there is no synchronisation message from a synchronising (or master) station for a period greater than a selected threshold.

As a variant, replacement may be decided upon by the designating means if there is no synchronisation message from a synchronising station for a period greater than a selected threshold. In this case, the auxiliary synchronising station is preferably capable of forming and transmitting the synchronisation messages as soon as it is designated;

the master (or synchronising) station and the synchronised slave stations may be adapted to place selected complementary data in the synchronisation message.

The invention also proposes a process for the transmission of messages (or data) between master and slave relay stations of the type described hereinbefore, including the following steps:

1) assigning a local reference time to each station;
2) relating the time-division scheme of each station to its local reference time and applying this time-division scheme to the transmission/reception of this station, the process being remarkable in that it moreover comprises the following steps:

3) forming at a relay station brought into a selected state a synchronisation message including information relating to a common frequency and, inter alia, representative of its time-division scheme, and of a common reference time, and possibly a network identifier,
4) then transmitting the synchronisation message via this station in the direction of at least one recipient relay station,
5) extracting from the recipient station the information relating to the common frequency contained in the synchronisation message,
6) adjusting the local reference time of this recipient station to the common reference time and applying the time-division scheme of the common frequency to the transmission/reception of the recipient station so as to bring the said recipient station into the said selected state, and
8) authorising the recipient station brought into the selected state to repeat steps 3) and 4).

This process may also comprise complementary steps, such as, inter alia, those in which the relay stations transmit polling messages if they have not received a synchronisation message for predetermined periods.

Other features and advantages of the invention will be clear from the following detailed description and from the accompanying drawings, in which:

FIG. 2 is a very simplified diagram showing a relay station;

FIG. 3 is a diagram showing an example of a frequency time-division evolution scheme, in a case referred to as "frequency hop";

FIG. 4 shows an example of a synchronisation message format;

FIG. 6 shows an example of a polling message format;

The accompanying drawings are essentially of a specific nature. Consequently, not only can they serve to complete this document, but they can also contribute to the definition of the invention if appropriate.

Figure 1:
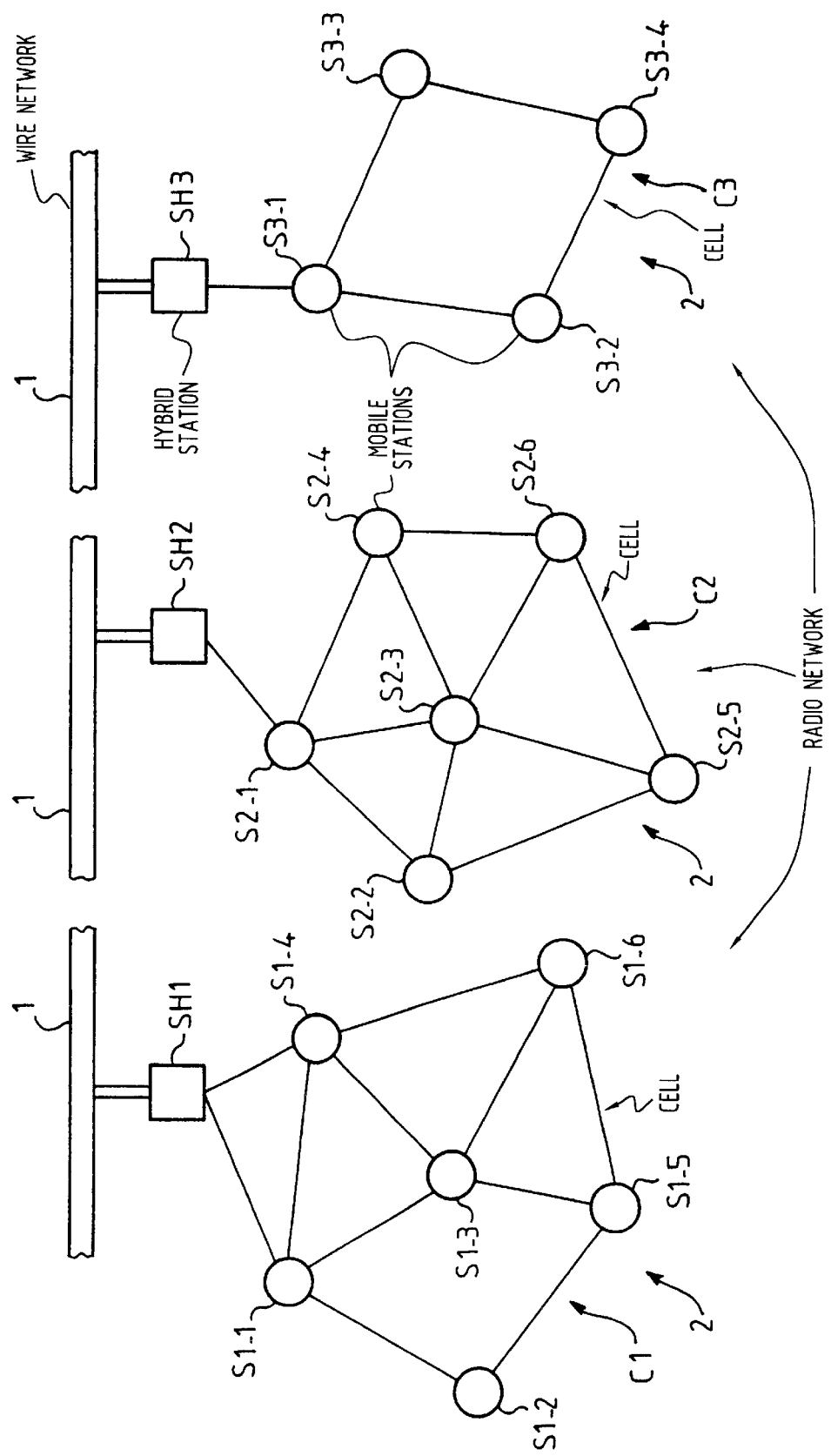
FIG. 1 is a very simplified diagram of a combined radio and wire network system according to the invention.

Reference will first be made to FIGS. 1 and 2 in order to describe an example of a system for the transmission of data (or messages, or frames) according to the invention. In this example, the system is of the combined type, in so far as it comprises one part in the form of a wire network 1 (indicated by double lines) and one part in the form of a radio network 2 (in which the connections between stations Sj–i (j=1 to 3; i=1 to 5) are indicated by single lines).

The radio network 2 is in fact subdivided here into cells Cj which each combine several mobile stations Sj–i which can exchange messages with the wire network 1 via hybrid stations SHj (physically connected to the said wire network).

In a previous Patent Application FR 9715870 of Dec. 15, 1997, the Applicant describes a system of this kind provided with hybrid stations capable of controlling the exchange of data between two types of radio and/or wire networks, the messages (or frames) of which do not have the same formats.

In the context of IEEE standard 802.11, in which a hybrid station SHj is identified at an access point ("Access Point" according to the terminology of this standard), the stations Sj–i of the radio network exchange service messages by which means topological information about all of the mobile stations and hybrid stations can be obtained at the access points so as to allow for efficient control of the distribution of messages of any type. A station can therefore be aware of which station(s) is/are listening to it and by which station(s) it is heard and can determine a preferential route between transmission relays, allowing a message to reach its destination rapidly. This type of system is described, inter alia, by the Applicant in his Patent Applications FR 9204032 and FR 9509928.

The hybrid and mobile stations of one single cell are referred to as "within range", in so far as messages are transmitted between two of them by step by step hops. Each cell therefore forms a connected network.

When a message is to be transferred from a mobile station of a first cell to another mobile station of a second cell, two possibilities can be envisaged. Either the wire network is used momentarily, as indicated in Patent Application FR 9715870 of Dec. 15, 1997, passing through the hybrid stations which then serve as relays, or the single radio network is used by using "relay" mobile stations belonging to different cells. Selection is effected by consulting the, inter alia, topological information provided by the aforementioned service messages. The term "relay" as used here refers to a communication node.

However, in this type of system, the mobile and hybrid relay stations have a special mode of operation. They transmit and receive on frequencies which vary over time. In other words, each relay station operates according to a frequency time-division evolution scheme peculiar thereto. All of the stations in one single network preferably have the same scheme. The problem is that the local internal clocks of each station are independent of one another, with the result that the transmitting/receiving frequencies of the different stations are rarely synchronised. This desynchronisation momentarily prevents the exchange of messages.

The aim of the invention is therefore to allow for efficient communication between the cells Cj of one or more networks.

To this end, the invention comprises relay stations SHj or Sj–i of the type illustrated in a very diagrammatic manner in FIG. 2.

Each relay station SHj or Sj–i first of all comprises a transmitting/receiving module 3 capable of transmitting and receiving messages (or frames) and, more generally, data, according to a format peculiar to the network to which it belongs and according to a frequency which varies over time according to a selected scheme. It will be considered hereinafter that the scheme is of the type referred to as "frequency hop", as illustrated in FIG. 3. Other types of evolution scheme are of course possible, e.g., inter alia, the type referred to as "direct-sequence spectrum spreading". In addition to the radio interface, the SHj stations include an interface with the wire network.

In the example illustrated in FIG. 3, the transmitting/receiving module 3 is adapted to operate according to four different successive frequencies, designated F1 to F4. In other words, the transmitting/receiving module 3 is adjusted for a first time interval between T0 and T1 to the frequency (or channel) F1, then for a second time interval between T1 and T2 to the frequency F2, then for a third time interval between T2 and T3 to the frequency F3 and finally for a fourth time interval between T3 and T4 to the frequency F4. As a result of the fact that the time-division evolution of the frequency is periodic in this example, after a period T between T0 and T4, a new frequency-hop cycle begins again from the first frequency F1 between the moments T4 and T8, and so on.

A time-division scheme therefore comprises the designation of several different frequencies, the (adjusting) period during which the relay station is supposed to operate on each of these frequencies, and the order of appearance of these different frequencies.

The beginning of a period cycle T serves as an absolute reference. However, in the knowledge of the scheme of a given relay station SH, it is possible to predict the evolution of its transmitting/receiving frequency at any moment and to relate the "absolute" reference to a relative reference.

In order to provide the transmitting/receiving module 3 with these time-division references or time bases, each relay station comprises a clock 4. By virtue of each clock 4, a local reference time is defined at each relay station, the local reference times of the different relay stations generally being different from one another relative to an absolute time reference.

Each relay station also comprises a control module 5 capable of processing the information contained in received messages and of forming messages for the transmission thereof via the transmitting/receiving module 3. Some messages may be formed directly at the control means 5. However, other messages may be issued at a higher level (or higher layer) 6.

According to the invention, at least one of the relay stations, e.g. SH1, is designated by the system as a "master" station. All of the other relay stations can therefore be referred to as "slave" stations. It is of course possible to provide several master stations if the design of the system so requires. Each relay station moreover includes a network identifier $I_R$ which specifies the number of the network to which the relay station belongs, or the number of the cell to which it belongs.

The control module 5 of the master station SH1 is considered by the system to be capable of permanently forming particular messages referred to as "synchronisation messages". Synchronisation messages of this kind include the network number of the station and information relating to a common frequency, to the time-division evolution scheme of this common frequency and a common reference time TC. This information defines the selected state.

The master station is referred to as "synchronising" (or permanently in a selected state) in so far as it is initially the one which can transmit the first synchronisation message intended to adjust in time (or synchronise) the other relay stations (possibly only certain others) referred to as slave stations.

A synchronisation message (or synchronisation frame) preferably, but not necessarily, comprises an identifier $I_S$ which specifies the type of message (in this case synchronisation message). The advantage of placing this identifier $I_S$ in a synchronisation message will be discussed hereinafter.

A synchronisation message (or frame) of this kind is illustrated in FIG. 4. In addition to the two message $I_S$ and network number $I_R$ identifiers, this message comprises a time-division scheme referred to as SCH which includes three types of information, namely the common time-division reference (or common reference time), the repetition period of the different frequencies and the frequency-hop parameters, i.e. the different frequencies and their respective durations.

A synchronisation message may also comprise other information (or complementary data), e.g. the status of the emitting station, namely synchronising (master) or synchronised (slave) and/or a sequence number.

Among this other information, it is also possible to provide auxiliary data, e.g. a "flag" specifying whether the transmitting station is in fact in the selected state, or whether it is in another state which can be referred to as "temporary". The term "temporary" refers to the state of a station which has not been synchronised for a predetermined period or which thinks it is not in the selected state.

This flag would allow slave relay stations to transmit temporary synchronisation before being brought into the selected state, and consequently to offer temporary synchronisation to the other stations before actually becoming synchronising (selected state). A flag of this kind can therefore signal to a station whether the synchronisation message it receives provides it with temporary synchronisation or not.

This auxiliary data (or flag) is preferably added to the synchronisation message by the control module 5 of the transmitting station which furthermore has a synchronisation module capable of extracting the auxiliary data from a synchronisation message received and of deciding to take account of this message as a function of the state represented by the auxiliary data. This provides a filtering function.

In the description given hereinafter, it will be considered by default that the synchronisation messages (or frames) originate from stations in the selected state.

The common frequency, its time-division scheme and the common reference time can be fixed in advance, but they may also be selected from a selection stored in a table. These parameters are preferably those of the master station, namely its local reference time, its local frequency and its local time-division evolution scheme (although it is conceivable to proceed in a different manner).

The control module 5 provides the transmitting/receiving module 3 with the synchronisation messages for the transmission thereof in the direction of the other relay stations SH2 and SH3, or in the direction of a selection of these. It will be clear that, in a variant, the control module 5 could provide the transmitting/receiving module 3 with only the information relating to the common frequency accompanied by the common reference time TC, i.e. the information designated SCH in FIG. 4, the transmitting/receiving module 3 adding one or more identifiers of the type described hereinbefore $I_S$ and $I_R$ thereto. In other words, in this variant, the synchronisation message is formed by the transmitting/receiving module 3.

So that all of the relay stations can extract the information contained in the synchronisation message transmitted by the master station SH1, they comprise a synchronisation module 7 connected to the clock 4, to the transmitting/receiving module 3 and to the control module 5. The function of this synchronisation module 7 is to extract from a synchronisation message transmitted completely or partially thereto by the transmitting/receiving module 3 having received it the information relating to the common frequency it contains, then, on the one hand, to readjust the local reference time defined by the local internal clock 4 to the common reference time TC contained in the said message and, on the other hand, to provide the transmitting/receiving module 3 with the common frequency and its time-division scheme.

In other words, this amounts to replacing the local reference time with the common reference time, and the local time-division scheme with the common time-division scheme when these two schemes are different.

The slave stations can be synchronised with the master station by virtue of this frequency and time-division readjustment. In other words, they are brought into the selected state from that point on. In the moments following this readjustment, the different synchronised relay stations can therefore relay (or broadcast) the synchronisation messages arriving at them and concerning them. It can thus be considered that the slave stations which have just been synchronised in turn become synchronising as they are brought into the selected state.

It will be clear that when the two schemes are substantially different, synchronisation can only be effected temporarily. In this case, the transmitting/receiving module 3 is adapted to memorise its local scheme and the common scheme so that it can operate with the said initial local scheme at the end of a predetermined time or after receiving a particular message after receiving the synchronisation message.

At this stage, the advantage of placing a network number identifier $I_R$ in a synchronisation message will be more readily clear as the latter signals to the recipient relay station whether the synchronisation message it has just received relates to the network to which it belongs or not. In this manner, if the message does not relate to its network, it can ignore it and become available for another task.

Similarly, the presence of a message-type identifier $I_S$ allows, e.g. the transmitting/receiving module 3 of a recipient relay station to deliver the said message partially or completely directly to the synchronisation module 7, such that it can extract the information relating to the scheme SCH therefrom. It will be clear that if the synchronisation message includes information other than that relating to the scheme, this other information can either be transmitted by the transmitting/receiving module 3 directly to the control module, or transmitted by the synchronisation module 7 to the control module 5, which can in turn transmit it to the higher layer 6 if the latter is the intended recipient of the said information.

In so far as the slave relay stations S1–i, SHj, Sj–i (irrespective of the values of i and j) are not necessarily adjusted to the transmitting frequency of the synchronisation message transmitted by the master station SH1, and in order to optimise synchronisation, the transmitting/receiving module 3 of each relay station is adjusted successively for predetermined periods to the different frequencies provided by its local time-division evolution scheme as soon as the slave station containing it is put into operation. A synchronisation message can be picked up very rapidly in this manner and it is consequently possible to extract the different frequencies provided by the common time-division evolution scheme it comprises therefrom and to memorise them. The transmitting/receiving module 3 then simply has to "scan" these different common frequencies when it wishes to bring itself into a mode in which it listens actively to the synchronisation messages.

If the cells Cj are non-contiguous from the point of view of radio transmission, synchronisation may be propagated by the wire network in order first of all to arrive at the hybrid stations SHj ($j \geq 2$), then stations Sj–i ($j \geq 2$, i any value) by means of radio transmission.

Of course, if the slave stations have the same local time-division evolution scheme as the common time-division evolution scheme, there is no need to memorise the frequencies of the synchronisation message as they are identical to the local frequencies.

Figure 5:
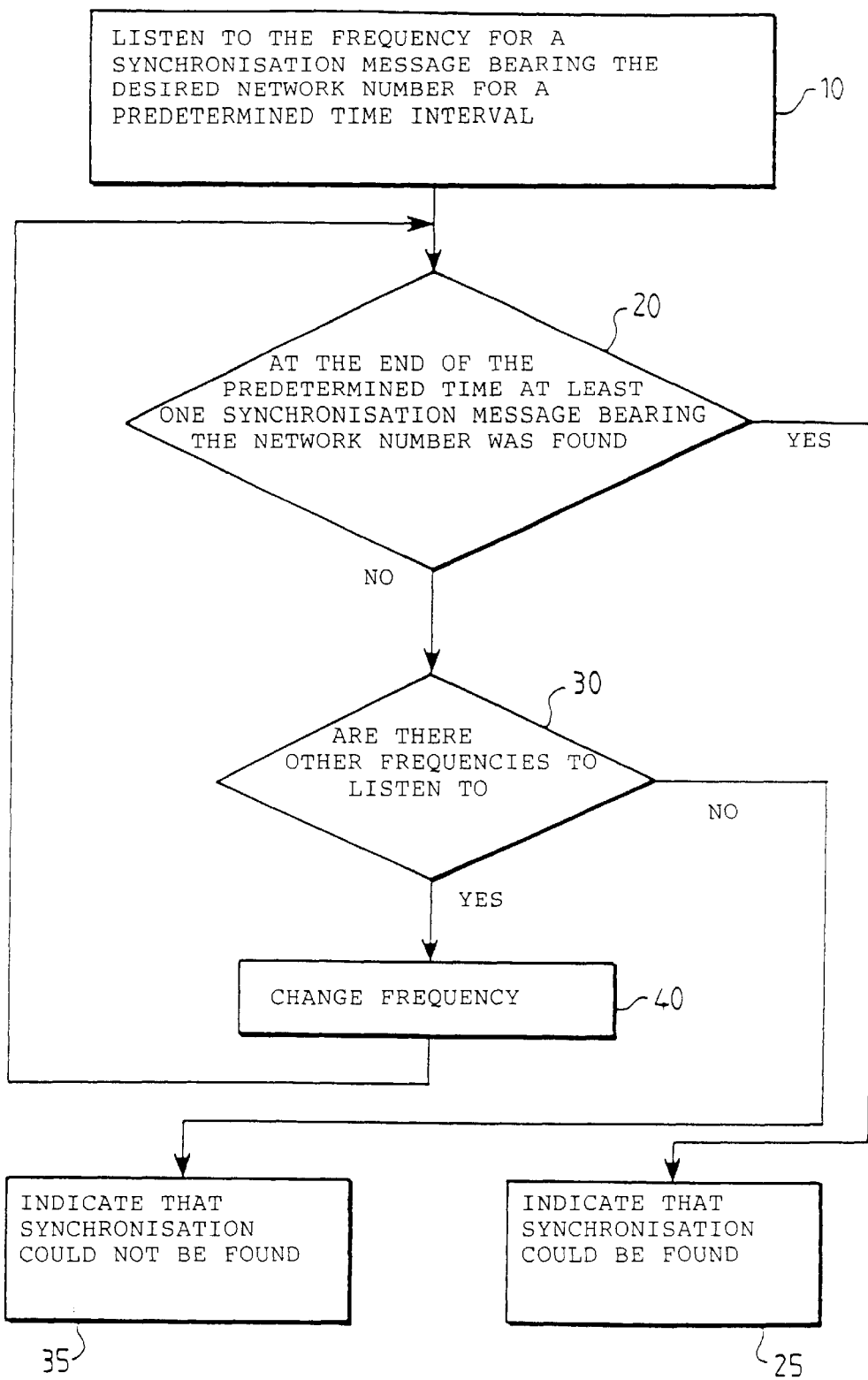
FIG. 5 is a block diagram showing the principal steps of passive synchronisation searching.

FIG. 5 illustrates a passive listening procedure in order to pick up synchronisation messages. It will be considered in this example that the recipient slave station is already aware of the different transmitting frequencies of the synchronisation messages. Of course, on the other hand, and as indicated hereinabove, the slave station scans the frequencies in advance in order to determine the said transmitting frequencies.

This procedure first of all comprises a step 10 in which the transmitting/receiving module 3 is adjusted to a first frequency and, if the latter is correct, searches in the synchronisation message, first of all to establish whether it contains the network number identifier $I_R$, then the synchronisation message identifier $I_S$.

In a step 20, the transmitting/receiving module 3 carries out a first test consisting, at the end of the predetermined period of adjustment to the first frequency, in verifying whether a synchronisation message bearing the network number of the recipient slave station has been found. If this is the case, the procedure for picking up a synchronisation message comes to an end and, preferably at a step 25, the transmitting/receiving module 3 indicates to the system, e.g. to the master station, that synchronisation has been found. On the other hand, if no message has been found at the end of the predetermined period of adjustment to the first frequency, the transmitting/receiving module 3 then carries out a second test in a step 30.

This second test 30 consists in determining whether there are other frequencies to which the module 3 is supposed to be adjusted. In the event of a negative response, the transmitting/receiving module 3 terminates the synchronisation message passive listening procedure and, preferably at a step 35, indicates to the system, e.g. to the master station, that synchronisation could not be found. As a variant, in the event of non-synchronisation, the procedure could be resumed completely at step 10.

On the other hand, if the result of the second test 30 is positive, the transmitting/receiving module 3 is adjusted to a new frequency (or channel), which constitutes step 40, then step 20 is repeated, and possibly steps 30 and 40, e.g. until synchronisation is obtained.

The durations of adjustment to the different frequencies for obtaining the synchronisation message are preferably much shorter than the usual periods of adjustment to the transmitting/receiving frequencies provided by the local and common time-division schemes. Durations of this kind are preferably typically of the order of approximately a hundred milliseconds.

The system may comprise a control centre for the master and slave relay stations (decision centre or designating means), as a result of which it can assign the network or cell numbers and decide upon the status of the different relay stations, namely master or slave relay stations. This assignment of competence (or status) to the relay stations can be effected the first time each of the relay stations is put into operation. However, the decision centre of the system is preferably able to modify the status of the relay stations as required, and above all according to the evolution of the different cells and/or networks as a function of, inter alia, geographical and/or atmospheric conditions.

The decision centre is preferably also capable of designating one of the slave relay stations as an auxiliary master station, such that, in the event of abnormal operation of the master station, this auxiliary master station can take over from the latter.

In this particular embodiment, it will be clear that the auxiliary master station must have the same design as the master station, i.e. it must be capable of providing the different slave stations with the synchronisation messages formed in advance at its control module 5.

More generally, processing of abnormal operation situations may be effected in different ways, as a function, inter alia, of the diagnostic report on this abnormal operation. A few possibilities will be given hereinafter, by way of strictly non-limiting examples.

In the variants in which the decision centre is capable of modifying the status of the relay stations if it seems appropriate, all of the relay stations of the system must be designed in the same manner, only their respective statuses differing at a given moment. They must consequently all be capable, in the event of modification of their status, of forming synchronisation messages intended for the other relay stations.

The change of status of the relay stations can be effected in two different ways according to the variants selected for the system.

When the statuses of the relay stations are fixed when they are put into operation and it is not possible to modify them subsequently, a particular procedure must be implemented so that the relay station initially designated as the auxiliary master station is capable of being substituted for the master station no longer functioning. To this end, the control module 5 of the auxiliary master station can automatically change the status of the station it comprises in association with its transmitting/receiving module 3 and its internal clock 4, e.g. if no synchronisation message has been received for a predetermined period equal to a time-division threshold.

On the other hand, i.e. when the respective statuses of the different relay stations can be modified at any moment, the said decision centre preferably itself carries out a procedure for changing the said statuses. E.g. if no synchronisation message is transmitted for a period greater than a selected threshold, the decision centre can automatically designate one of the slave relay stations as the auxiliary master station, or directly as a new master station. Designation as an auxiliary master station is preferable in so far as it avoids having to modify the status of the preceding master station which may display temporary abnormal operation For the control requirements of the network, it may be advantageous to subdivide the network and therefore to change the network numbers of some stations and select a new master station or stations. This can be effected by the decision centre.

Each station, and therefore particularly the decision centre, may moreover be provided with topological information about the network and therefore, in particular, it can be aware of the stations connected thereto. This can serve, e.g. to diagnose any synchronisation problems, as a station which is not connected cannot be synchronised. Breakdown should be looked for at this station or at neighbouring stations which should be synchronising stations for the latter station.

As already indicated hereinbefore, once they have been synchronised with the master station (or brought into the selected state), the slave relay stations are capable of themselves forming replies to synchronisation messages received from this master station in order to transmit them in the direction of the other slave relay stations.

The transmission of synchronisation messages may be punctual or periodic. Similarly, it can be spontaneous or triggered, if this is felt to be necessary, according to the system variants.

The slave stations are moreover advantageously capable of themselves requesting synchronisation with the master station. This is advantageous, inter alia, when a slave station has broken down for a relatively long period in relation to the transmitting frequency of the synchronisation messages.

To this end, the relay stations, and more particularly their control modules 5, must be capable of forming a polling message and addressing it via their transmitting/receiving modules 3 in the direction of the master station. The format of a polling message of this kind is given by way of example in FIG. 6. It comprises at least one identifier of the message type $I_I$. It is preferably also accompanied by a network number identifier $I_R$, such that the master station, upon receiving this polling message, includes the same network number identifier in the synchronisation message as addressed to the station transmitting the polling message in response thereto. This is optional, but allows transmission of the synchronisation message, and also the polling message, to be accelerated. The polling message may of course comprise other types of information, e.g. the identifier for the transmitting slave station.

It will be clear that the master station and the synchronising stations must be capable of receiving polling messages of this kind and of forming synchronisation messages in response thereto.

The transmitting/receiving module 3 of the master station and the synchronised stations is capable of detecting the identifier of the message type $I_I$ and, if found, of transmitting a "coded" signal to the control module 5, such that it forms a synchronisation message which the said transmitting/receiving module 3 will then transmit in the direction of the requesting slave station. It should be noted that in systems in which it is the transmitting/receiving modules which form the messages, the coded signal is sufficient for the control module to form the synchronisation message which then will be formed and addressed to the requesting station by the transmitting/receiving module. On the other hand, the transmitting/receiving module transmits the polling message to the control module which in return provides it with a synchronisation message ready to be transmitted in the direction of the requesting station.

It will be clear that in systems in which the status of the relay stations can evolve over time, the transmitting/receiving modules and the control modules of all of the relay stations, both master and slave relay stations, must be capable of forming polling messages and of detecting messages of this kind.

Figure 7:
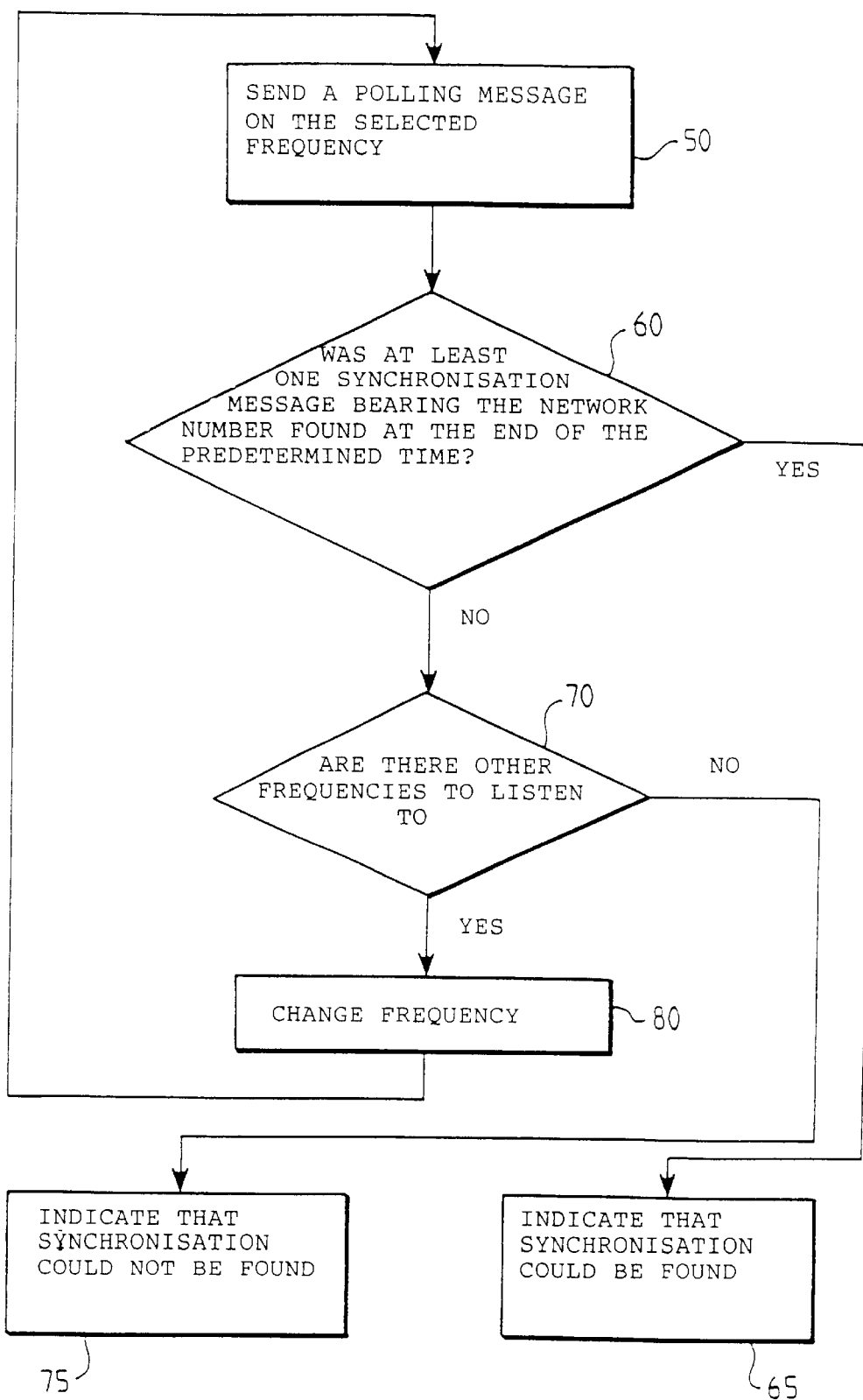
FIG. 7 is a block diagram showing the principal steps of active synchronisation searching.

An example of an active synchronisation searching procedure is illustrated in FIG. 7. This procedure comprises a step 50 in which a requesting slave station transmits a polling message on a first selected frequency which is preferably one of the transmitting frequencies for the synchronisation messages of a synchronising station. Then, in a step 60, the requesting slave station carries out a first test consisting, at the end of a predetermined time, in verifying whether a synchronisation message bearing its network number has been received. If the test is positive, i.e. if a message has been received, the synchronisation message searching procedure comes to an end in a step 65 during which the requesting slave station signals to the system, e.g. to the master station, that synchronisation has been found.

On the other hand, if the result of the first test 60 is negative, the requesting slave station then carries out a second test 70 during which it determines whether it has to be adjusted to other frequencies still not tested. If the result of this second test 70 is negative, then, in a step 75, the requesting slave station indicates to the system, e.g. to the master station, that synchronisation could not be found. In some variants, an indication of this kind can trigger the automatic transmission of a synchronisation message by the master station.

On the other hand, if the result of the second test 70 is positive, i.e. if frequencies have not yet been used, the transmitting/receiving module 3 then adjusts to a new frequency (or channel) in a step 80, then restarts step 50 by transmitting a new polling message on the new frequency selected. Step 60 is then carried out once again, and possibly also steps 70 and 80 and so on, until either step 75 or step 65.

It will be clear that, upon receiving a synchronisation message following a polling request, the slave station adopts the synchronisation parameters received.

The system according to the invention also optionally allows for a procedure for the resynchronisation of all of the different relay stations, both master and slave relay stations.

It will be clear that, in the case of slave stations, this resynchronisation procedure can only take place after a prior active or passive synchronisation procedure.

This resynchronisation procedure consists, upon receiving a synchronisation message transmitted by the master station or by a slave station previously synchronised with the master station, in comparing the common reference time extracted from the synchronisation message received at the local reference time defined by the clock, then, when this common reference time is greater than the local reference time, preferably in substituting the local reference time with the common reference time extracted. This makes it possible to accelerate the general synchronisation of all of the relay stations of the system, or at least those of one single network or one single cell. Resynchronisation of this kind is particularly useful, e.g. when the local internal clocks of some relay stations drift.

A resynchronisation procedure of this kind can also be envisaged if a slave station receives a synchronisation message transmitted by the master station in response to a polling message transmitted by the said slave station.

Figure 8:
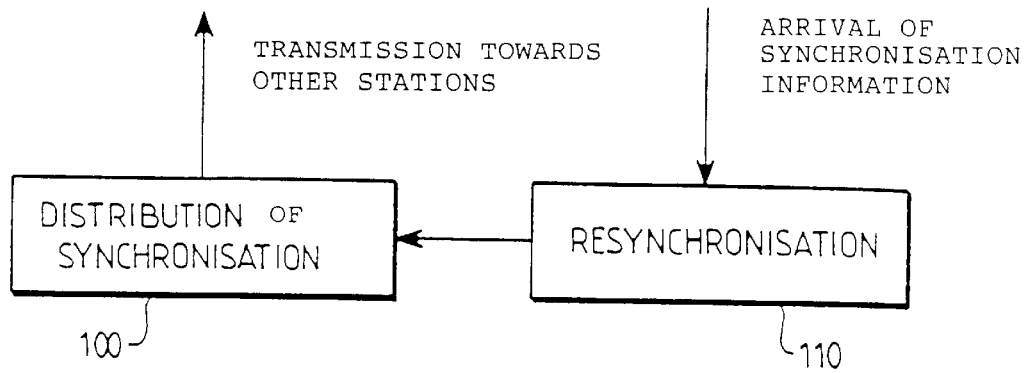
FIG. 8 is a block diagram showing the organisation of the tasks in a master relay station.
Figure 9:
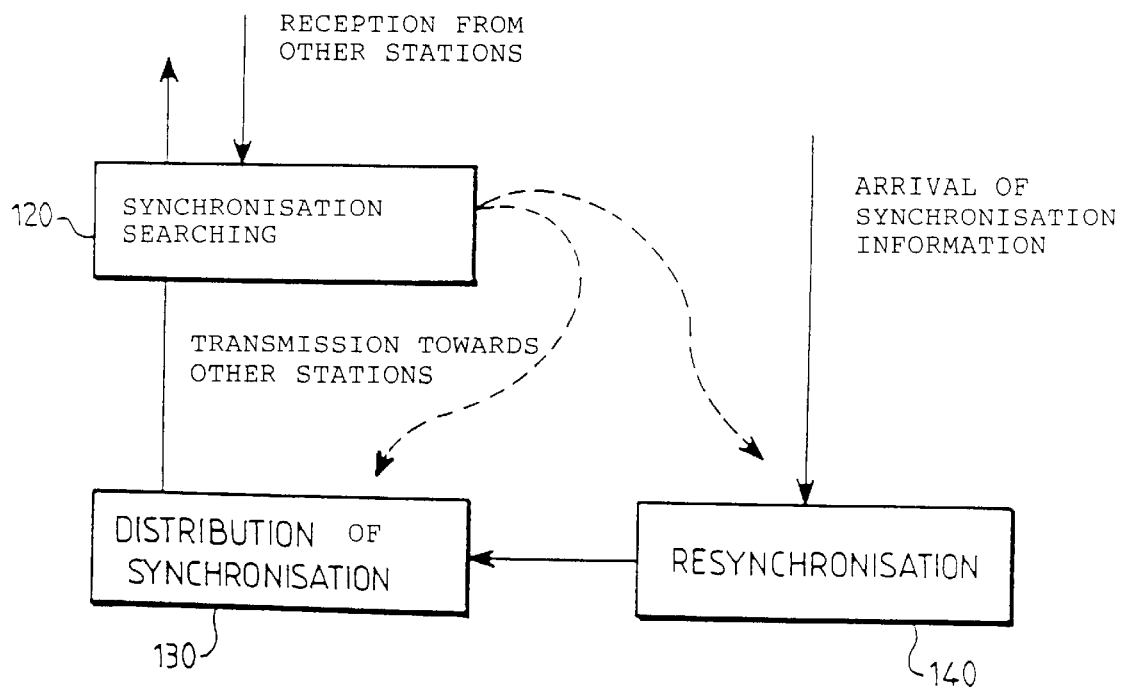
FIG. 9 is a block diagram showing the organisation of the tasks in a slave relay station.

FIGS. 8 and 9 show the different tasks associated with synchronisation for the master and slave stations respectively.

As illustrated in FIG. 8, the main function 100 of the master station is to distribute synchronisation messages to the other relay stations. This task 100 comprises both the spontaneous transmission of synchronisation messages and the transmission of synchronisation messages in response to a polling message. The master station also performs an internal resynchronisation task 110, described hereinbefore, effected upon receiving synchronisation messages transmitted by the slave stations. This resynchronisation task 110 influences the different synchronisation tasks in so far as it automatically readjusts the local reference time of the master station and consequently the common time.

As illustrated in FIG. 9, the main task 120 of the slave stations is to search for synchronisation (then to broadcast the latter). This task 120 is activated as soon as the slave station in question is put into operation, or, inter alia, if the network or cell number is changed. It consists, inter alia, of the passive searching described hereinbefore with reference to FIG. 5, or of the active searching described hereinbefore with reference to FIG. 7.

The slave station performs a second task 130 of the type designated 100 in FIG. 8, consisting in distributing synchronisation messages after obtaining a first synchronisation.

Finally, the slave station performs a third task 140 which consists in resynchronising its internal clock if it receives synchronisation information from other relay stations, both master and slave stations, containing a reference time in advance of (or greater than) the local reference time. It will be clear that, as in the case of the master station, the resynchronisation task 140 influences the synchronisation distribution task 130.

The presence of a network identifier and the fact that the master station is controlled by synchronisation prevents the appearance of non-synchronised components of the network.

A resynchronisation task of this kind can be carried out, e.g. approximately every 500 milliseconds.

The different messages used in the synchronisation procedures described hereinbefore, depending on the type of system, can make use of both the wire (or cable) network and the radio network, as required, provided that the network system remains connected when taking account of the coverage obtained by the wire connections and the radio connections. The expression "wire network" as used here refers to a network in which the stations are connected by electric cables or optical fibres.

It should moreover be noted that it may be advantageous to maintain synchronisation between stations connected by cable in the case of searching referred to as "rapid roaming" by the person skilled in the art.

The invention is particularly suitable for the radio network the format of which is selected, inter alia, from the HIPERLAN standard and IEEE standard 802.11. IEEE standard 802.11 is particularly preferred in so far as it can use a spectrum-spreading and a frequency-hop transmission system.

In the case of a wire network, the invention is moreover particularly suitable for the network the format of which is selected from the ISO standards for the IEEE standards 802.3, 802.5 and 802.14.

It is of course possible to envisage transmitting synchronisation messages by means of a wire route with the aid of hybrid stations of the type described hereinbefore in order to connect mobile extensions belonging to remote cells. This possibility accelerates the transmission speed of the message, as a result of the fact that the transmission speeds of wire networks are greater than those of radio networks. These wire networks then serve as shortcuts. It should also be noted that, by virtue of these hybrid stations, it is possible to transmit synchronisation messages between radio networks functioning according to different frequencies (or channels).

Consequently, e.g. the stations (SH2, S2–i) may receive synchronisation messages by radio if there is an overlap between the cell covered by the stations (SH1, S1–i) and the cell covered by the stations (SH2, S2–i). On the other hand, they can request synchronisation by the cable network which connects SH1 and SH2. SH2 can either listen to the synchronisation messages originating from SH1 or request synchronisation information directly from SH1 according to mechanisms similar to those described with reference to FIGS. 5 or 7, except that, with a cable, there is only one frequency to be considered. E.g. it is possible to select hybrid stations SHj ($j \geq 2$) preferably synchronised with the master hybrid station SH1 by means of the wire network.

The invention also relates to processes for the transmission of data (or messages) using the relay stations described hereinbefore, adapted to transmit and receive on frequencies which vary according to a selected time-division scheme. The processes for the transmission of messages according to the invention include the following steps:

in a first step, a local reference time is assigned to each relay station, in a second step, the time-division scheme of each station is related to its local reference time and this time-division scheme is applied to the transmission/reception of this relay station, in a third step, a synchronisation message including information relating to a common frequency, and, inter alia, the time-division scheme of this frequency accompanied by a common reference time, is formed at a relay station brought into a selected state, in a fourth step, the synchronisation message formed during the third step is transmitted via this station in the direction of the recipient relay stations, referred to as "slave" relay stations, in a fifth step, the information relating to the common frequency is extracted from the synchronisation message received by the recipient station, in a sixth step, the local reference time of the recipient relay station is then adjusted to the common reference time extracted from the synchronisation message and the time-division scheme of the common frequency extracted in this manner is applied to the transmission/reception of the recipient station so as to bring the said recipient station into the said selected state, and in a seventh step, the recipient station brought into the selected state is authorised to repeat the third and fourth steps, such that synchronisation can be relayed (or broadcast). This step is effected recursively in the slave stations after obtaining synchronisation thereof (or time-division adjustment).

The process may also comprise the steps of searching for the transmitting frequencies of the synchronisation messages and/or the steps of transmitting the polling messages and/or the resynchronisation steps described hereinbefore with reference to the variant systems.

Reference has been made hereinbefore to stations provided with modules and other means. These modules and means must be understood to be both specific electronic components (or circuits) and programmed procedures.

The invention is not limited to the embodiment described hereinbefore purely by way of example, but also covers variants of both systems and processes which may be developed by the person skilled in the art within the scope of the accompanying claims.

This document therefore describes a system in which the information relating to the common frequency contained in the synchronisation messages comprises the list of frequencies in the evolution scheme for the common frequency and the respective durations of these frequencies. However, the information relating to the common frequency may comprise only an identifier for the list of frequencies and associated durations, the relay stations then including a memory in which there is stored a table showing the correspondence between the identifiers for the list and the lists and durations.

It moreover describes a system including one single network. However, the invention also applies to systems including several networks which can be identified, e.g. by one single number and functioning according to possibly different synchronisation.

What is claimed is:

1. A data transmission system, comprising:
    relay stations (SHj, Sj–i) that exchange messages therebetween by radio communication, each relay station provided with a network number ($I_f$) and including
        a clock (4) defining a local reference time,
        a module (3) transmitting/receiving messages on a frequency varying according to a selected time-division scheme defined relative to the local reference time, and
        a control module (5) forming the messages to be transmitted and processing the messages received,
    wherein the control module (5) of each relay station (SHj, Sj–i) in a selected state forms synchronization messages, arranged to synchronize certain other relay stations to form at least part of a network and including its network number ($I_f$) and information relating to the selected state,
    wherein at least one of the relay stations (SH1) is identified as a "master station", the control module (5) of the master remaining permanently in the selected state, and
    wherein each relay station (SHj, Sj–i) includes a synchronization module (7) responsive to receipt of a synchronization message containing a network number corresponding to that of the station which hosts it, for extracting the status information therefrom in order to bring its relay station into the selected state.

2. System according to claim 1, characterised in that the information relating to the said selected state contained in the synchronisation messages includes at least information relating to a common reference time and to a common frequency and, inter alia, representative of the time-division scheme of the said common frequency.

3. System according to claim 2, characterised in that each synchronisation module (7) is capable of extracting the information relating to the said common frequency and to the said common reference time from a synchronisation message received by the associated transmitting/receiving module (3), then, on the one hand, of adjusting the local reference time defined by the clock (4) to the common reference time and, on the other hand, of providing the said transmitting/receiving module (3) with the said information relating to the common frequency, the said relay station being in the said selected state when its local reference time is the common reference time and when its transmitting/receiving module (3) is capable of transmitting/receiving messages on the said common frequency varying according to the time-division scheme of the latter.

4. System according to one of claim 2, characterised in that the said information relating to the common frequency comprises an identifier for the list of frequencies in its evolution scheme and of the respective durations of these frequencies.

5. System according to one of claim 2, characterised in that the said information relating to the common frequency comprises the list of frequencies in its evolution scheme and the respective durations of these frequencies.

6. System according to one of claim 1, characterised in that the said relay stations are connected together.

7. System according to one of claim 1, characterised in that each synchronising station (SHj, Sj–i) is adapted to place in the synchronisation message an identifier specifying that the said message is a synchronisation message, and in that each transmitting/receiving module (3) is adapted to determine whether a message contains a synchronisation message identifier ($I_S$) and, if so, to transmit the said message to the synchronisation module (7).

8. System according to one of claim 1, characterised in that the said transmitting/receiving module (3) of each relay station (SHj, Sj–i, irrespective of the values of i and j, except SH1) is adapted to be adjusted successively to the different frequencies provided by its time-division evolution scheme for predetermined periods so as to pick up any synchronisation message transmitted by a synchronising station.

9. System according to one of claim 1, characterised in that it is capable of combining network segments.

10. System according to claim 9, characterised in that the network segments are radio network segments.

11. System according to claim 9, characterised in that the network segments belong to radio and wire networks.

12. System according to one of claim 10, characterised in that the format of a radio network is selected from at least the format of the "HIPERLAN" standard and the format of IEEE standard 802.11.

13. System according to one of claim 11, characterised in that the format of a wire network is selected from at least the ISO standards for the IEEE standards 802.3, 802.5 and 802.14.

14. System according to one of claim 1, characterised in that the network(s) is/are referred to as frequency-hop network(s).

15. System according to one of claim 1, characterised in that the network(s) is/are referred to as direct-sequence spectrum spreading network(s).

16. System according to one of claim 1, characterised in that it is capable of assigning network numbers to the said relay stations (SHj, Sj–i) when they are put into operation.

17. System according to one of claim 1, characterised in that each transmitting/receiving module (3) is adapted to determine whether a message contains a network number corresponding to that to which the relay station which hosts it belongs and to transmit the said message to the synchronisation module (7) in the event of correspondence.

18. System according to one of claim 1, characterised in that the control modules (5) of the relay stations brought into the selected state (SHj, Sj–i) are adapted to transmit the said synchronisation messages spontaneously.

19. System according to claim 18, characterised in that transmission is substantially periodic.

20. System according to one of claim 1, characterised in that the synchronisation module (7) of the relay stations (SHj, Sj–i) brought into the selected state is capable, upon receiving a synchronisation message, of comparing its local reference time with the common reference time extracted from the information contained in this message and of automatically readjusting its local reference time to the common reference time extracted when this local reference time lags behind the said common reference time.

21. System according to one of claim 16, characterised in that the control modules (5) of the relay stations (SHj, Sj–i) are adapted to form polling messages requesting the transmission of a synchronisation message and to provide the transmitting/receiving module (3) with the said polling messages for the transmission thereof, and in that, upon receiving a polling message, the control module (5) of a station brought into the selected state (SHj, Sj–i) is capable of forming a synchronisation message provided with the information specifying the network number extracted from the said polling message by the transmitting/receiving module (3) for the transmission thereof.

22. System according to one of claim 1, characterised in that the said synchronising station (SH1) is adapted to place in the synchronisation message information specifying its synchronising station status permanently verifying the said selected criterion (master station).

23. System according to one of claim 1, characterised in that it comprises means capable of designating a relay station as a synchronising station permanently verifying the said selected criterion.

24. System according to claim 23, characterised in that the said designating means are capable of designating a relay station as an auxiliary synchronising station verifying the said selected criterion.

25. System according to claim 23, characterised in that designation is effected when the relay station in question is put into operation.

26. System according to claim 24, characterised in that the said auxiliary synchronising station is adapted to form and spontaneously transmit the synchronisation messages if there is no synchronisation message from the synchronising station for a period greater than a selected threshold.

27. System according to claim 23, characterised in that the said designating means are capable, if there is no synchronisation message from the synchronising station for a period greater than a selected threshold, of designating another relay station as an auxiliary synchronising station verifying the said selected criterion.

28. System according to claim 27, characterised in that the said auxiliary synchronising station is adapted to form and transmit the synchronisation messages as soon as it is designated.

29. System according to one of claim 1, characterised in that the relay stations brought into the selected state are adapted to place selected complementary data, in particular a sequence number, in the synchronisation message.

30. System according to one of claim 1, characterised in that the control module (5) of each relay station (SHj, Sj–i) no longer in the said selected state is adapted to form the said synchronisation messages accompanied by auxiliary data capable of signalling that the transmitting station is not in the said selected state, but in a state referred to as "temporary", in that the control module (5) of each relay station (SHj, Sj–i) brought into the said selected state is adapted to form the said synchronisation messages accompanied by auxiliary data capable of signalling that the transmitting station is in the said selected state, and in that the synchronisation module of each relay station (SHj, Sj–i) is capable, upon receiving a synchronisation message, of extracting the auxiliary data therefrom and of deciding to take it into account as a function of the state it represents.

31. Process for the transmission of data between relay stations that exchange messages therebetween by radio communication, each relay station having a network number and transmitting/receiving on frequencies varying according to a selected time-division scheme, the process including the following steps:

1) assigning a local reference time to each station, 2) relating the time-division scheme of each station to its local reference time, 3) forming at one of the relay stations in a selected state, a synchronisation message arranged to synchronize certain other relay stations to form at least part of a network and including the station's network number and information relating to a common frequency and representative of its time-division scheme, and of a common reference time, 4) then transmitting the synchronisation message via the one station in the direction of at least one recipient relay station, 5) extracting from the recipient station the information relating to the common frequency contained in the synchronisation message when the latter contains a network number corresponding to that of the recipient station, 6) adjusting the local reference time of the recipient station to the common reference time and applying the time-division scheme of the common frequency to the transmission/reception of the recipient station so as to bring the recipient station into the selected state, and 7) authorising the recipient station brought into the selected state to repeat said steps 3) and 4).

* * * * *